US012601426B2

(12) United States Patent
Duri et al.

(10) Patent No.: US 12,601,426 B2
(45) Date of Patent: Apr. 14, 2026

(54) CRYOGENIC TURBOPUMP FEED LINE

(71) Applicant: ARIANEGROUP SAS, Les Mureaux (FR)

(72) Inventors: Davide Duri, Forêt de Vernon (FR); Charles-Hubert Bachelet, Forêt de Vernon (FR); Alexandre Brial, Forêt de Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 630 days.

(21) Appl. No.: 17/996,661

(22) PCT Filed: Apr. 14, 2021

(86) PCT No.: PCT/FR2021/050656

§ 371 (c)(1),
(2) Date: Oct. 20, 2022

(87) PCT Pub. No.: WO2021/209717

PCT Pub. Date: Oct. 21, 2021

(65) Prior Publication Data

US 2023/0160501 A1 May 25, 2023

(30) Foreign Application Priority Data

Apr. 16, 2020 (FR) ...................................... 2003841

(51) Int. Cl.
*F16L 9/19* (2006.01)
*B33Y 80/00* (2015.01)
(Continued)

(52) U.S. Cl.
CPC ................. *F16L 9/19* (2013.01); *B33Y 80/00* (2014.12); *F16L 9/006* (2013.01); *F16L 59/141* (2013.01)

(58) Field of Classification Search
CPC ........................................................ F16L 9/19
See application file for complete search history.

(56) References Cited

U.S. PATENT DOCUMENTS 4,215,727 A * 8/1980 ter Wijlen ............... E21B 43/08
138/112
5,501,840 A * 3/1996 Mantovani ................ F16L 9/19
494/20
(Continued)

FOREIGN PATENT DOCUMENTS

CN 106885067 A 6/2017
DE 19920059 A1 11/2000
(Continued)

OTHER PUBLICATIONS

Kadant NPL, written Nov. 24, 2020 (Year: 2020).*
(Continued)

*Primary Examiner* — Kenneth Rinehart
*Assistant Examiner* — Haotian Lu
(74) *Attorney, Agent, or Firm* — Bookoff McAndrews, PLLC

(57) ABSTRACT

Cryogenic turbopump feed line, comprising a main channel able to transport a cryogenic fluid, a plurality of secondary channels parallel to and disposed around the main channel in which the plurality of secondary channels are disposed on the periphery of an external perimeter of the main channel.

15 Claims, 8 Drawing Sheets

(51) Int. Cl.
    *F16L 9/00*        (2006.01)
    *F16L 59/14*      (2006.01)

(56)             References Cited

U.S. PATENT DOCUMENTS

| | | | | |
|---|---|---|---|---|
| 5,765,598 | A | * | 6/1998 | Goddard .................. F16L 9/12 |
| | | | | 138/116 |
| 2014/0124077 | A1 | * | 5/2014 | Malas ................... F16L 59/141 |
| | | | | 138/114 |
| 2014/0305529 | A1 | * | 10/2014 | Kroll ....................... B22F 10/47 |
| | | | | 264/401 |
| 2016/0286739 | A1 | | 10/2016 | Buff |
| 2019/0211949 | A1 | * | 7/2019 | Custer ...................... F16L 9/19 |

FOREIGN PATENT DOCUMENTS

| | | | | |
|---|---|---|---|---|
| DE | 20316589 | U1 | | 1/2004 |
| DE | 202008006379 | U1 | * | 8/2008 ........... B21C 23/085 |

| | | | | |
|---|---|---|---|---|
| EP | 2730831 | A1 | | 5/2014 |
| JP | S58025887 | U | | 2/1983 |
| JP | 2009204135 | A | | 9/2009 |
| JP | 2012214148 | A | | 11/2012 |
| JP | 2019536931 | A | | 12/2019 |
| WO | WO-2013017730 | A1 | * | 2/2013 ............... F16L 9/19 |

OTHER PUBLICATIONS

International Search Report and Written Opinion issued in International Application No. PCT/FR2021/050656 on Jul. 13, 2021 (18 pages).
Notice of Reasons for Rejection issued in corresponding application No. JP2022563047, mailed Mar. 18, 2025.

* cited by examiner

[Fig. 1]
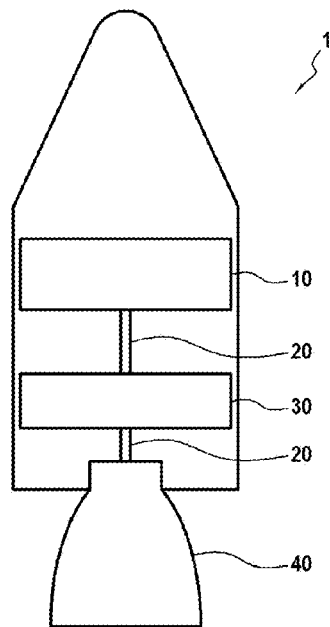
[Fig. 2]
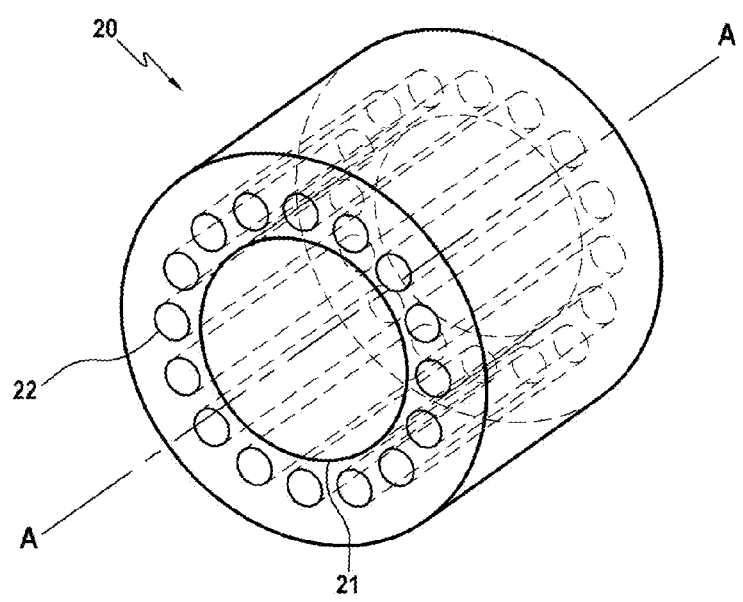

[Fig. 3]
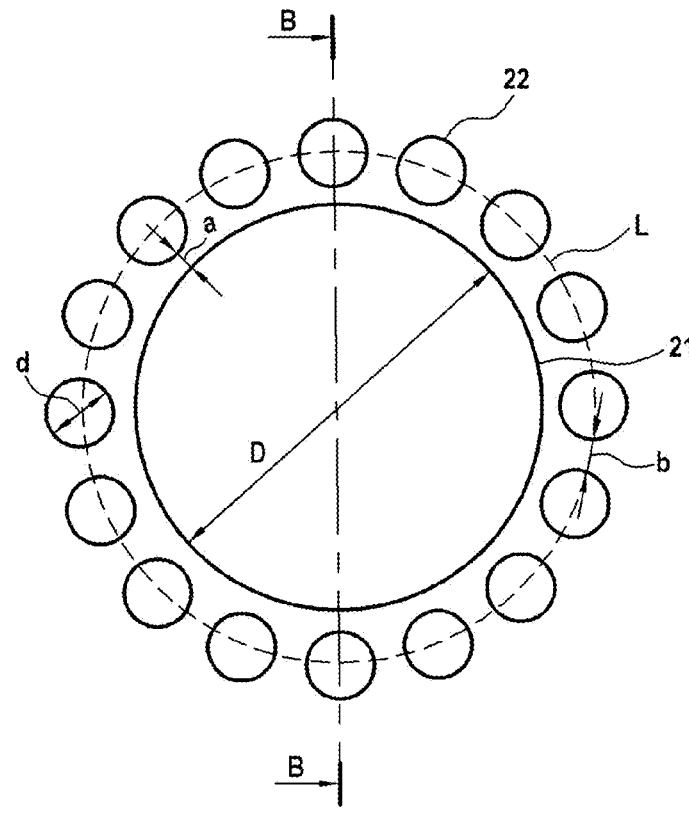
[Fig. 4A]
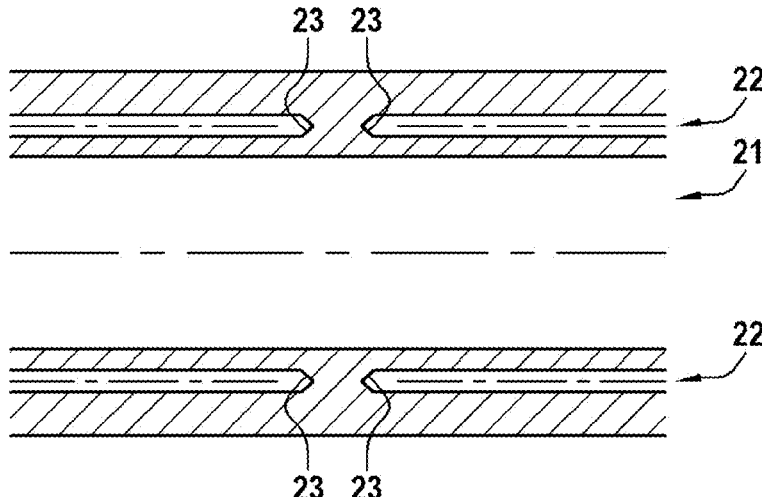

[Fig. 4B]
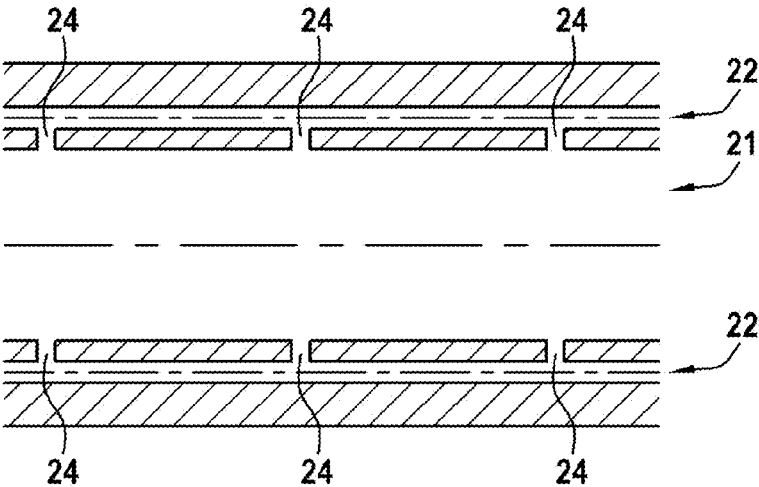
[Fig. 5A]
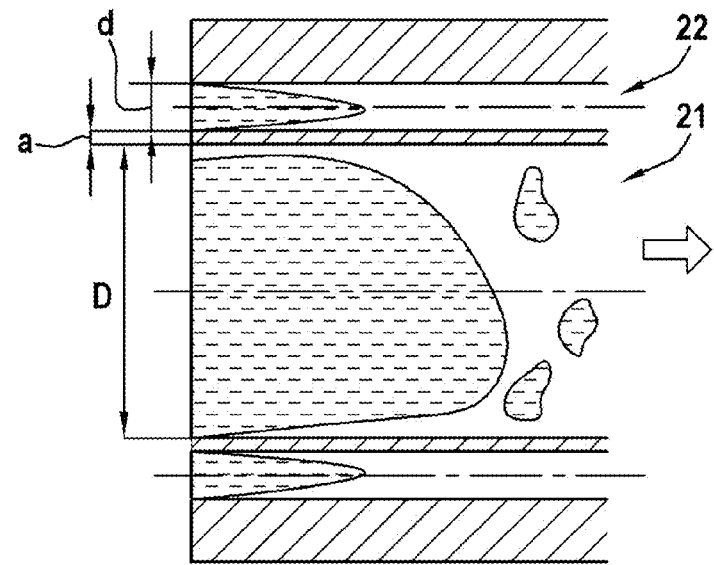

[Fig. 5B]
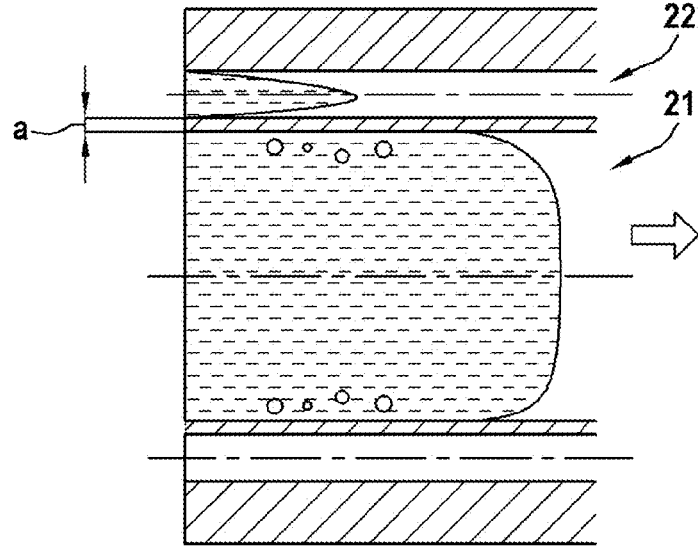
[Fig. 5C]
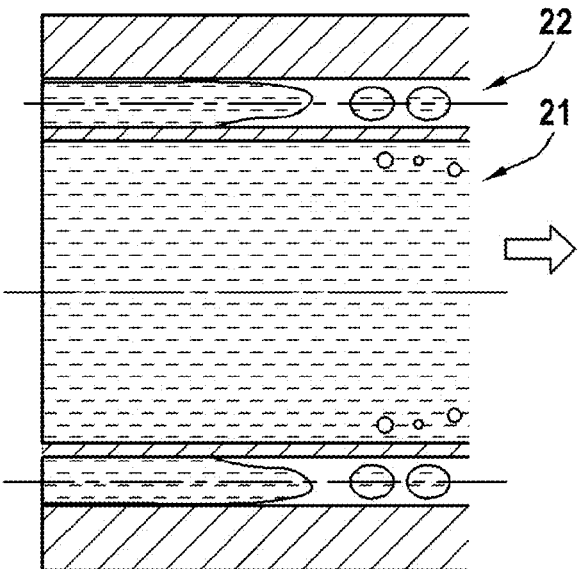

[Fig. 5D]
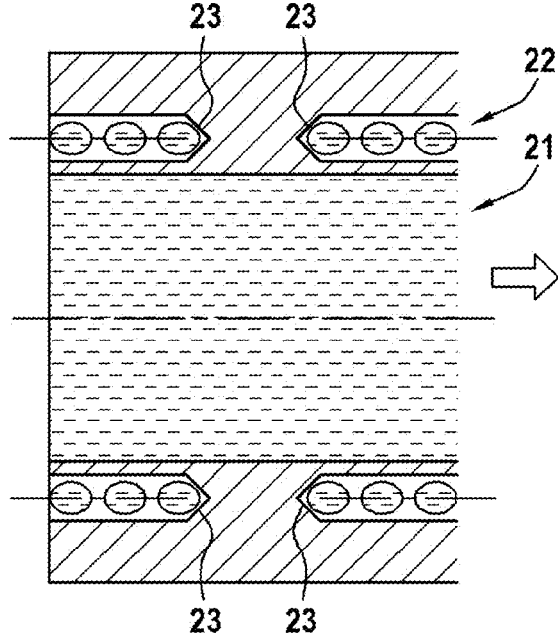
[Fig. 6]
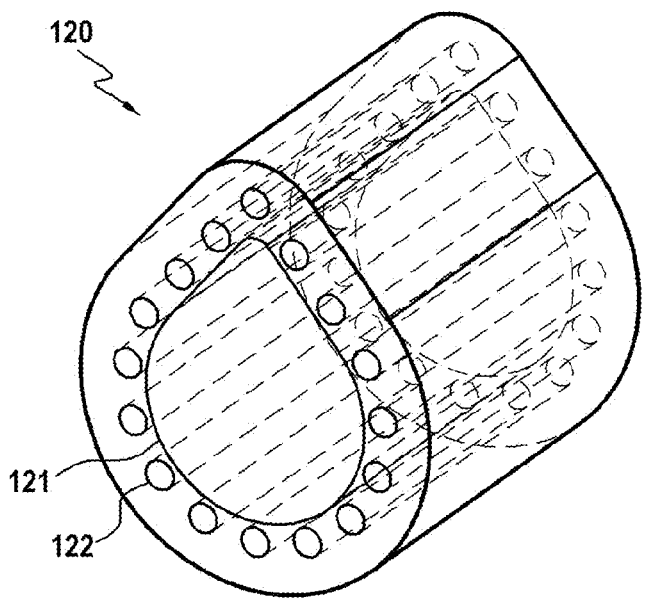

[Fig. 7]
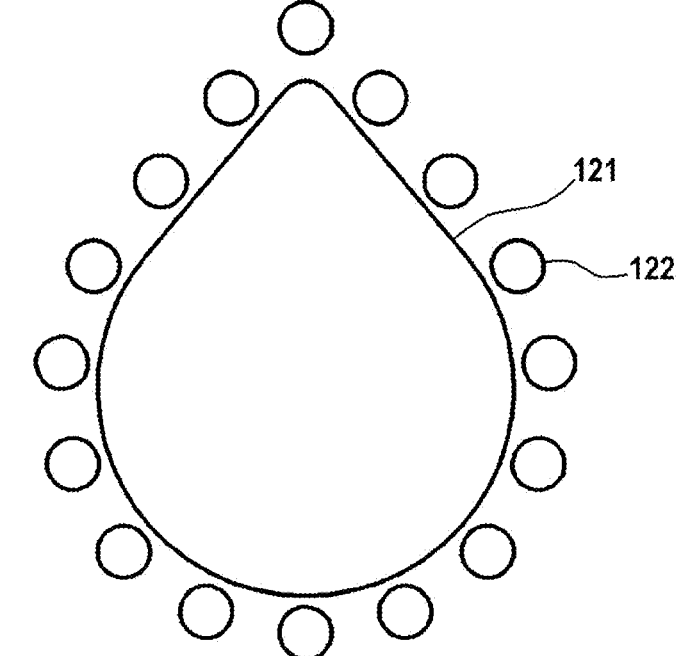
[Fig. 8A]
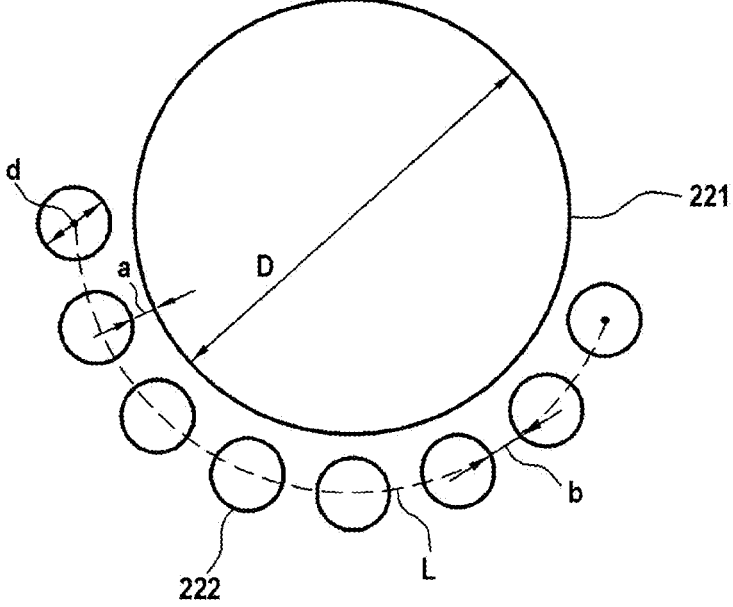

[Fig. 8B]
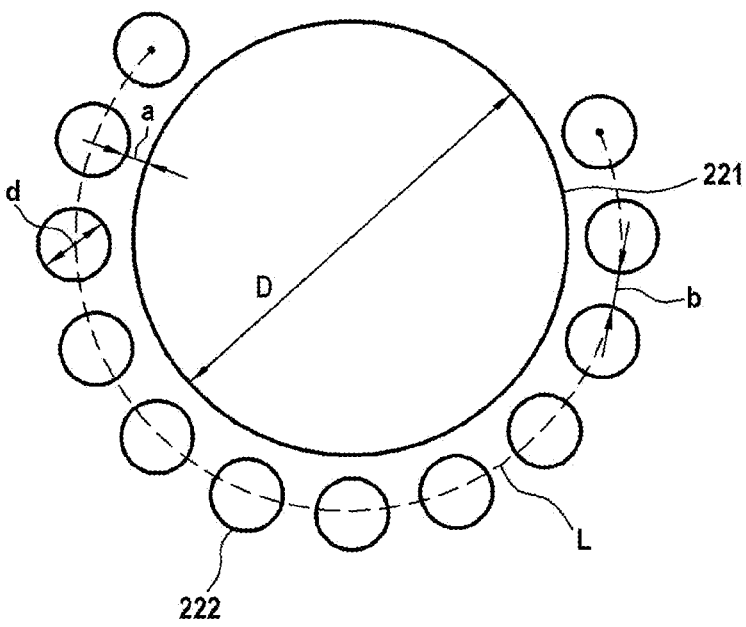
[Fig. 9]
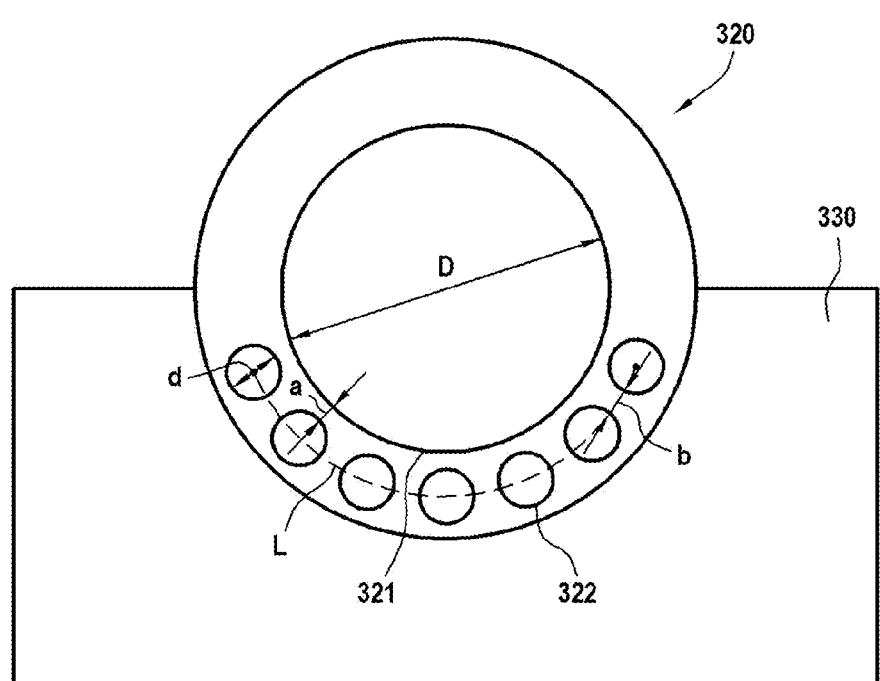

[Fig. 10]
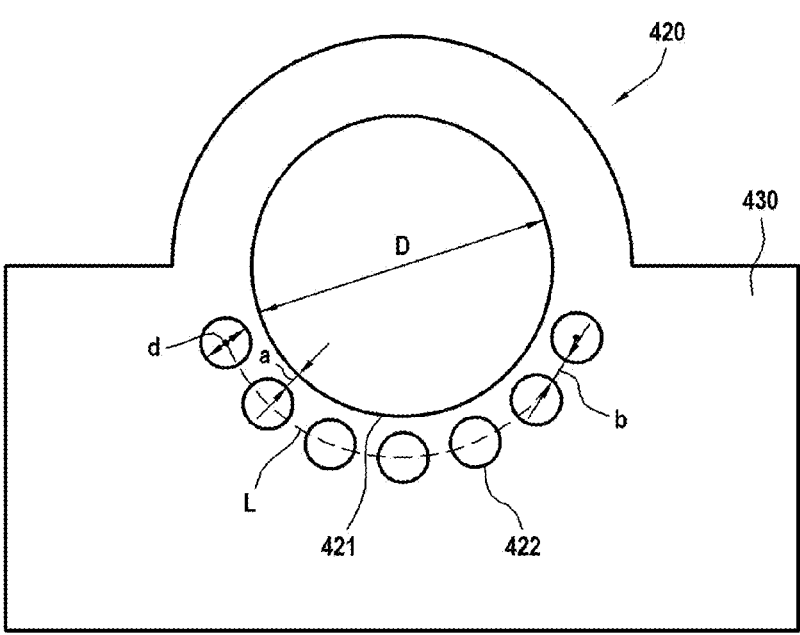
[Fig. 11]
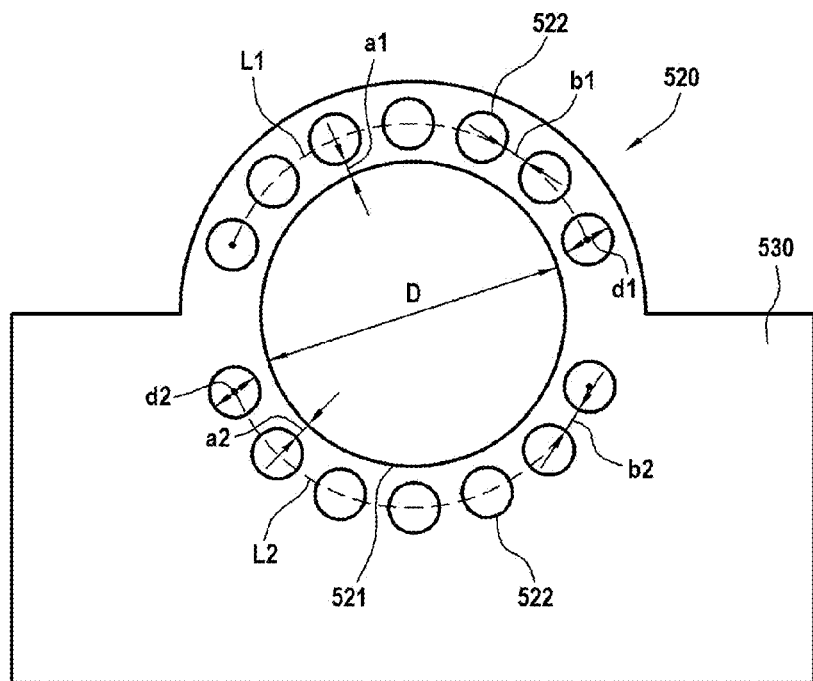

CRYOGENIC TURBOPUMP FEED LINE

CROSS-REFERENCE TO RELATED APPLICATION(S)

This patent application is the U.S. National Stage entry under 35 U.S.C. § 371 of International Application No. PCT/FR2021/050656, filed on Apr. 14, 2021, which claims the benefit of priority to French Application No. 2003841, filed on Apr. 16, 2020.

TECHNICAL FIELD

The present invention relates to a cryogenic turbopump feed line.

PRIOR ART

In the field of liquid propulsion rockets, the propulsion is obtained by the combustion of liquid propellants. The different engine components therefore have an operating temperature close to the temperature of the propellants (20K for LH2, 110 K for CH4, 900 K for LOx). The chilldown phase consists in bringing the main components of the engine from the ambient temperature to the nominal operating temperature.

More specifically, in a cryogenic propulsion system, the chilldown can have the objective of avoiding the occurrence of at least the following phenomena:

cavitation in at least one cryogenic propellant feed pump, leading to an overspeed of the pump and a drop of performance, embrittlement of the materials due to the heat shocks, loss of tightness as a result of uncontrolled thermal gradients, overheating and divergence of bearings, and static and/or dynamic imbalances of rotary parts, due to clearances in the bearings.

The chilldown can thus be finalized when functional criteria are met, for example criteria relating to the clearance between mechanical components, to the temperature of the walls, to the mechanical strength of the turbopump components or to the homogeneity of the fluid.

The fluid used during chilldown is limited to this use. Particularly, when the propellant is used for the chilldown, it cannot be used to generate thrust, and the payload of the rocket is reduced. In addition, some engines are reusable, or have rapid changes in the operating temperature, so that the duration of the thermal transition phase is a critical issue for improving the engine and rocket performances.

Particularly, at the beginning of the chilldown phase, when the temperature difference is maximum between the walls at ambient temperature and the propellant, the propellant is vaporized by forming a gas film insulating the wall of the liquid core (film boiling), and the heat transfer occurs unfavorably.

In some feed lines, many additional parts as well as coatings are used to reduce the duration of the thermal conditioning of the parts. These solutions complicate the manufacture and the assembly of the lines subjected to a wide temperature range, and the coating also presents a risk of detachment which leads to pollution of the secondary circuits.

There is therefore a need for a cryogenic turbopump feed line reducing the duration of the chilldown and reducing the consumption of propellant during the chilldown, and which is devoid, at least partly, of the drawbacks of the known configurations mentioned above.

DISCLOSURE OF THE INVENTION

The present disclosure relates to a cryogenic turbopump feed line, comprising:

a main channel able to transport a cryogenic fluid, a plurality of secondary channels parallel to and disposed on the periphery of an external perimeter of the main channel.

Such a feed line has the advantage of reducing the volume present around the main channel, so that the mass to be brought to temperature during the chilldown is all the more reduced as the channels are numerous and bulky, while reducing the thermal conductance between the main channel and a periphery external to the secondary channels. This allows using a reduced amount of propellant to heat up a reduced volume of material limited to a close vicinity of the main channel. In addition, the secondary channels allow concentrating the film boiling at the beginning of the chilldown at the expense of the main channel, which can then be cooled by more favorable exchanges.

In some embodiments, the plurality of secondary channels are disposed around the main channel. In other words, the plurality of secondary channels are disposed over the entire periphery of an external perimeter of the main channel.

In some embodiments, the plurality of secondary channels are disposed partially around the main channel.

"Partially around the main channel" should be understood such that the secondary channels are disposed on one or several portions of a contour around the main channel, in other words on one or several non-adjacent segments of the contour.

In other words, the plurality of secondary channels are disposed on one or several partial contours around the main channel. The plurality of secondary channels can then be disposed on one or several portions of the periphery of an external perimeter of the main channel. In the remainder description of this invention, the terms "partial contour" and "portion of a contour" have the same meaning.

In some embodiments, the plurality of secondary channels are disposed on a plurality of non-adjacent secondary channels.

In some embodiments, viewed from a cross-section of the line, at least one portion of a contour passing through the centers of the plurality of secondary channels may have a ratio R between the length of the contour not crossing a secondary channel to the total length L of the contour less than 40%, preferably less than 25%.

By "contour" is understood a complete contour, that is to say a delimitation defining a portion internal and a portion external to the contour. In the case of the feed line, the internal portion comprises the main channel. A portion of a contour corresponds to a segment of a contour, that is to say an element of a contour presenting at least two distinct and unjoined ends.

The heat exchanges through and between the secondary channels being of lower amplitude than the radial exchanges through the spaces between the secondary channels; the ratio is comparable to the ratio between the exchange surface in the presence of secondary channels, and the exchange surface if the secondary channels were not present, which amounts approximately to the ratio of the thermal conductance between a periphery radially internal and a periphery radially external to the secondary channels in the presence of secondary channels to the same thermal conductance in the absence of secondary channels.

In some embodiments, the secondary channels can be discontinuous.

The secondary channels can thus play the role of "back-waters", in which the cryogenic fluid can penetrate and be established.

In some embodiments, the line can have radial orifices for connection between the primary and secondary channels.

These orifices make it easier to supply the secondary channels with fluid from the primary channel, while limiting the circulation of the fluid through the secondary channels, and to facilitate the cleaning or maintenance operations on the line, for example the purging of residual material after manufacture or the purging of the residual propellant after use.

In some embodiments, the plurality of secondary channels can open out onto at least one of an upstream end and a downstream end of the line.

This structure allows supplying the plurality of secondary channels with fluid and facilitating the cleaning of the secondary channels.

In some embodiments, the main channel and the plurality of secondary channels can be separated by a strip of thickness less than 3 mm, preferably less than 2 mm.

Such dimensioning allows preserving the structural integrity of the line while limiting the material present in the direct vicinity of the line.

In some embodiments, the secondary channels can have a substantially circular cross-section.

The circular shape is preferred to minimize the perimeter of the main channel, and therefore the exchange surface, for a given sectional area of the main channel.

In some embodiments, a cross-section of the main channel can have a surface between 50 mm$^2$ and 700 mm$^2$, preferably between 75 mm$^2$ and 450 mm$^2$, perpendicularly to a flow direction.

In some embodiments, a gap between two successive secondary channels in the vicinity of an element of the perimeter of the main channel with no ridges can be less than 3 mm, preferably 2 mm.

Such dimensioning allows preserving the structural integrity of the line while reducing thermal conductance.

In some embodiments, the main channel can have a substantially circular cross-section.

In a second embodiment, the main channel can have a cross-section in the shape of a water drop, with a base having substantially the shape of an arc of a circle with two ends from which two joining segments extend.

The drop shape facilitates the additive manufacturing method by reducing the overhang material angles and thus limiting the risk of collapse during manufacture.

In some embodiments, an insulating material can be provided in the secondary channels.

The insulating material allows limiting the risks of pollution through the line, for example by preventing the passage of detachable particles through the secondary channels.

In some embodiments, the insulating material is a special epoxy resin for cryogenic applications.

The present disclosure also relates to a method for manufacturing the feed line, the method having at least one manufacturing step by an additive manufacturing method.

BRIEF DESCRIPTION OF THE DRAWINGS

The attached drawings are schematic and are intended primarily to illustrate the principles of the disclosure.

In these drawings, from one figure to another, identical elements (or portions of elements) are identified by the same reference signs. In addition, elements (or portions of elements) belonging to a different exemplary embodiment but having a similar function are identified in the figures by numerical references incremented by 100, 200, 300, 400, 500.

FIG. 1 is a schematic view of a space launcher,

FIG. 2 is an isometric perspective view of a line of the space launcher of FIG. 1, FIG. 3 is a cross-sectional view of the line of FIG. 2, FIG. 4A is a first example of an axial sectional view of the line, FIG. 4B is a second example of an axial sectional view of the line, FIG. 5A is a sectional view of the line along the axis B-B of FIG. 3, during the chilldown, FIG. 5B corresponds to FIG. 5A at a subsequent chilldown moment, FIG. 5C corresponds to FIGS. 5A and 5B at a further subsequent chilldown moment, FIG. 5D corresponds to an end of chilldown in the case of the line of the first example, FIG. 6 is an isometric perspective view of a line according to a second embodiment, FIG. 7 is a schematic cross-sectional view of the line of FIG. 6.

FIG. 8A is a cross-sectional view of a line according to a third embodiment.

FIG. 8B is a cross-sectional view of a line according to one alternative of the third embodiment.

FIG. 9 is a cross-sectional view of a line according to a fourth embodiment.

FIG. 10 is a cross-sectional view of a line according to a fifth embodiment.

FIG. 11 is a cross-sectional view of a line according to a sixth embodiment.

DESCRIPTION OF THE EMBODIMENTS

In the present disclosure, the terms "axial", "radial", "internal", "external" and their derivatives are defined in relation to the main axis of the line; by "axial plane" it is meant a plane passing through the main axis of the line and by "radial plane" it is meant a plane perpendicular to this main axis; finally, the terms "upstream" and "downstream" are defined in relation to the fluid circulation direction in the line.

FIG. 1 schematically represents a rocket 1 comprising at least one tank 10, at least one turbopump 30 and at least one rocket engine 40 communicating by means of lines 20. The tank 10 contains a propellant fed to the rocket engine 40 by means of the turbopump 30 and the lines 20.

The operating temperature of the turbopumps 30 is close to the temperature of the propellants, and is for example of approximately 20 K (Kelvin) for liquid dihydrogen (LH2), 110 K for methane (CH4) and 90 K for oxygen.

A schematic representation according to a perspective view of the line 20 is represented in FIG. 2.

The line 20 can be made of an alloy suitable for cryogenic uses, for example Inconel 718. The material of the line 20 is hereinafter referred to as "the material of the line" or "the interstitial material".

The line 20 has a main axis A-A extending in the main direction of the line 20.

The line 20 comprises a main channel 21, in which the propellant can circulate.

A plurality of secondary channels 22 are disposed around the main channel 21, parallel to the main channel 21.

For example, the secondary channels can be 10 to 30 in number.

It is advantageous for a cross-section of the line 20 to be identical along the main axis A-A, for example to limit head losses and/or thermal conduction to the outside of the line 20. However, the present invention is not limited to this embodiment, and the shapes and dimensions may vary, for example in the presence of a bend.

FIG. 3 shows one example of a cross-section of the line 20 along a radial plane.

The main channel 21 and the plurality of secondary channels 22 have cross-sections of substantially circular shapes. The secondary channels 22 are disposed on the periphery of the main channel 21.

Particularly, in a cross-sectional view, the centers of the secondary channels are disposed on a circle concentric with the circular external contour of the main channel 21, the circle being represented in broken lines.

The main channel 21 has a diameter D, and the secondary channels have a diameter d, smaller than the diameter D.

The disposition of the secondary channels 22 around an external perimeter of the main channel 21 is such that the secondary channels 22 do not intersect the main channel 21. Thus, a distance can be defined between a point on a periphery of a secondary channel 22 and a point on a periphery of the main channel 2. Particularly, this distance reaches a minimum between the point of a secondary channel 22 closest to the center of the main channel 21 and the point of the directly opposite secondary channel 22, located on the same radial plane, corresponding to the distance a represented in FIG. 3.

In other words, in the present case of circular channels 21, 22 and seen in a cross-section, a ring is defined between the external contour of the main channel 21 and the smallest circle concentric and tangent to the secondary channels 22, this ring having a thickness a.

The circle passing through the centers of the secondary channels therefore has a perimeter L such that:

$$L = 2\pi(D/2 + a + d/2) \qquad \text{[Math. 1]}$$

The secondary channels 22 are disjoint, and the circle passing through the centers of the secondary channels 22 successively crosses the secondary channels 22 and the interstitial material of the line 20. A ratio R is defined, corresponding to the ratio of the perimeter of this circle which crosses the interstitial material of the line 20. In other words, the ratio R is the ratio of the total sum of the distances b between the contours of the secondary channels 22 while following the circle, divided by the perimeter L of the circle. This gap b between two successive secondary channels 22 is less than 3 mm, preferably less than 2 mm.

In the case where the number of secondary channels is greater than 10, the distance b between two secondary channels 22 while following the circle is comparable to the distance between the perimeters of the secondary channels 22.

The dimensions of the line are such that the ratio R is less than 40%, preferably less than 25%.

The thermal conductance through the interstitial material of the line 20 being approximately two orders of magnitude greater than the conductance through the secondary channels comprising a gas mixture, this reduction in the ratio R allows reducing the thermal conductance between the main channel 21 and the exterior of the line 20. Particularly, due to the orders of magnitudes of conductance, the thermal conductance between the main channel 21 and the exterior of the line 20 is comparable to the thermal conductance through the interstitial material of the line 20. Therefore, the thermal conductance is proportional to the ratio R, so that a ratio R of 25% divides the thermal resistance of the line 20 by 4, which allows reducing the mass to be chilled down, thus reducing the duration of chilldown as well as the amount of propellant consumed for the chilldown.

The cross-section of the main channel 21 has a surface between 50 mm$^2$ and 700 mm$^2$, preferably between 75 mm$^2$ and 450 mm$^2$. Particularly, in the case of a circular section, this corresponds to a diameter of the main channel 21 approximately comprised between 8 mm and 30 mm, preferably between 10 mm and 24 mm.

The thickness a of the ring is less than 3 mm, preferably less than 2 mm.

Three examples of implementation of the secondary channels will be described in relation to FIGS. 4A and 4B, representing sections along an axial plane whose intersection with the radial plane of FIG. 3 is represented by the axis B-B.

FIG. 4A is a schematic representation of the line 20, in which the secondary channels 22 are discontinuous, and have an interstitial space 23 between two successive channels located on the same axis. This interstitial space 23 prevents the communication between two secondary channels 22 of the same axis.

As represented in FIG. 4A, the secondary channels 22 can also be opening out onto at least one of an upstream end and a downstream end of the line 20, thus allowing the entry of the propellant into a portion of the secondary channels 22.

FIG. 4B is a schematic representation of the line 20, in which a plurality of radial orifices 24 are provided between the main channel 21 and the secondary channels 22 in order to allow the circulation of the fluid between the main 21 and secondary 22 channels.

These three exemplary implementations are compatible, and can be set out independently of each other.

Particularly, if at least one of the three exemplary implementations is used, the propellant can fill the secondary channels 22. Such an example of an axial section of a line 20 is described in relation to FIGS. 5A, 5B and 5C presenting three successive chilldown phases in this order, as well as FIG. 5D showing an end of chilldown in the case of a line having secondary channels 22 with interstitial spaces 23. The liquid propellant is represented by a fill pattern with dashes, while the interstitial material of the line 20 is represented by a pattern of continuous diagonal lines. A gas phase is represented by a plain surface. An arrow represents the direction of circulation of the propellant towards the downstream portion.

FIG. 5A represents a first chilldown phase, in which the liquid has just penetrated the main 21 and secondary 22 channels. The temperature gradient is high, the surfaces of the channels still being hot compared to the cryogenic temperature of the propellant. A layer of vapor unfavorable to heat exchanges is then formed between the channels and the propellant, while a downstream portion of the propellant breaks up into drops.

Subsequently, as represented in FIGS. 5B and 5C, the presence of the propellant in the secondary channels 22 allows accelerating the heating up of the ring located between the main channel 21 and the secondary channels 22, which reduces the temperature difference between the channels and the fluid, and thus allows the propagation of the liquid front over the entire length of the line 20.

Particularly, in the example of FIG. 5D, the secondary channels 22 can be filled with propellant while the interstitial spaces 23 prevent the circulation of the propellant over the entire length of the secondary channels 22, which then play the role of "backwaters" in which the propellant will stagnate and gradually vaporize. This allows facilitating the chilling around the secondary channels 22, but also ensures the thermal insulation of the main channel 21 when the propellant contained in the secondary channels 22 is vaporized. The propellant can then circulate in the main channel 21 while remaining mainly in the liquid phase, which corresponds to the end of chilldown.

The secondary channels 22 can also be filled with an insulating material, for example a special epoxy resin for cryogenic applications.

A second embodiment of a line is presented in relation to FIGS. 6 and 7.

FIG. 6 is a perspective view of a line 120 in which the main channel 121 has a cross-section in the shape of a water drop, that is to say with a base having substantially the shape of an arc of a circle at the ends of which two joining segments are disposed.

Secondary circular-shaped channels 122 are disposed so that their centers are located on a contour having a shape similar to the shape of the main channel 121.

The ratio R is then defined along the contour passing through the centers of the secondary channels 122, while a cross-section of the line 120 has a strip of thickness a between the main 121 and secondary 122 channels.

The line 20, 120 can be implemented by additive manufacturing methods.

Particularly, the drop shape allows facilitating the implementation by powder bed fusion methods, while the communications between the channels 121, 122 as well as the opening out secondary channels 122 allow facilitating the discharge of residual powders.

In the first and second embodiments of the line, the secondary channels 22, 122 have been represented all around the external perimeter of the main channel 21, 121.

A third embodiment of the line will be described in relation to FIGS. 8A to 8B.

The third embodiment is a modification of the first embodiment, and the common elements will not be described again.

The line 220 of the third embodiment differs from the line 20 of the first embodiment in that the secondary channels 222 are disposed on the periphery of an external perimeter of the main channel, on a partial contour around the main channel.

As represented in FIGS. 8A and 8B, the line 220 has the same disposition of secondary channels 222 as the line 20 of FIGS. 2 and 3 on a lower half of the line 220, while the upper half has no secondary channels 222.

On the partial contour presenting the secondary channels 222, the secondary channels 222 can then play the role of thermal insulation of the main channel 221 as described above. This thermal insulation function is maintained over the entire partial contour of the secondary channels 222.

Such a disposition allows locally adjusting the thermomechanical performances of the line, which will be described in more detail in relation to the embodiments of FIGS. 9 and 10.

It is understood that the definition of the length L of the contour and the definition of the ratio R defined above for an entire contour can be generalized to the disposition of secondary channels 222 on a partial contour.

The portion of a contour considered is then the portion of a contour located between the centers of the secondary channels 222 located at the ends of the partial contour, and passing through the centers of the secondary channels 222 located between the centers of the secondary channels 222 of the ends of the partial contour.

The length L of the partial contour is represented in the sectional views of FIGS. 8A and 8B.

FIG. 8B represents a cross-sectional view according to one alternative to the line of FIG. 8A, in which the partial contour on which the secondary channels 222 are disposed is longer, and has a greater number of secondary channels 222.

It will be noted that the alternatives of FIGS. 8A and 8B correspond to the line of FIG. 3 in which some secondary channels 222 have been removed and the other secondary channels 222 have been held in the same position.

Therefore, the dimensions a, b, d, and D being identical, the ratio R is the same for the alternatives of FIGS. 3, 8A and 8B, because the variation of the length L between these alternatives is compensated by the variation in the number of secondary channels.

It is understood that a line can have secondary channels disposed over more than one portion of a contour. Two distinct and non-adjacent portions of a contour are characterized when two successive secondary channels have a gap at least greater than three times, preferably twice the gap b between two successive secondary channels of the same portion of a contour. In the case where the gaps b are different, the criterion of distinction between two distinct and non-adjacent portions of a contour can be based on the minimum gap, the maximum gap, the median gap or the average gap between two successive secondary channels.

It is understood that the definition of the contour length L and the definition of the associated ratio R can also be generalized to a line having secondary channels formed on several distinct and non-adjacent portions of a contour, by defining a partial contour length and a partial ratio for each of the partial contours of the line.

One example of line having a plurality of partial contours will be described in relation to FIG. 11.

It is understood that the definition of the contour length L and the definition of the associated ratio R can also be generalized to a line having secondary channels formed on several distinct and non-adjacent portions of a contour, by defining a partial contour length and a partial ratio for each of the partial contours of the line.

FIGS. 9 and 10 respectively show a fourth and a fifth embodiment of a line.

In the fourth embodiment of FIG. 9, the line 320 is mounted against a volume 330. This embodiment can be implemented for example to limit the space occupied by the line or according to another example to improve its stability or for both at the same time.

Due to the presence of the volume 330, the thermal inertia is locally increased in the vicinity of the main channel 321 of the line 320, which leads to a greater consumption of propellant for the chilldown of the line 320. Furthermore, the presence of secondary channels 322 in the vicinity of the interfaces between the portions of the line 320 external to the volume 330 and those integrated into the volume 330 can weaken the line 320 subjected to high thermomechanical stresses during the chilldown phase.

In response to this increase in the thermal inertia, secondary channels 322 can then be positioned on a partial contour, corresponding to positions located in the vicinity of the volume 330.

This disposition of secondary channels 322 allows improving the thermal performances of the line 320 in the vicinity of the volume 330, while maintaining satisfactory mechanical performances by not having secondary channels 322 at positions of the line 320 away from the interfaces between the portions of the line 320 external to the volume 330 and the portions of the line 320 integrated into the volume 330.

Such a disposition then allows improving the thermal behavior of the line 320 by locally adapting the chilldown duration. This also allows homogenizing the chilldown of the line 320.

In the fifth embodiment of FIG. 10, an additional volume 430 is provided. This embodiment differs from the fourth embodiment in that the volume 430 forms part of the line 420.

Similarly to the fourth embodiment of FIG. 9, the secondary channels 422 are disposed in the vicinity of a volume 430.

The volumes 330, 430 are described as additions of material external or internal to the line 320, 420, resulting in an increase in the thermal inertia in the vicinity of the main channel 321, 421. It will be understood that the volumes 330, 430 designate by extension any element causing a degradation of the thermal performances of the line, comprising but not limited to a local change of material; or the presence of a heat source such as an electronic cable.

The sixth embodiment of FIG. 11 corresponds to the embodiment of FIG. 10, having an additional partial contour at positions away from the volume 530.

The addition of an additional partial contour allows in particular improving the thermal behavior of the line 520 at a position away from the volume 530.

As for the embodiment of FIG. 8 and FIG. 9, the line 520 does not have secondary channels 522 at positions of a contour of the line 520 located at the interfaces between the portions of the line 520 external to the volume 530 and the portions of the line integrated into the volume 530.

The absence of secondary channels 522 at these positions then allows mechanically reinforcing the line 520 there.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

In particular, the characteristics described above are not limited to a circular-shaped line, but are also compatible with any other line shape, for example with a line in the shape of a water drop as described above.

Furthermore, the sixth embodiment of FIG. 11 presents two partial contours, for which the parameters R, L, a, b, d have been differentiated and indexed in R1, L1, a1, b1, d1 and R2, L2, a2, b2, d2 respectively. It is indeed understood that each partial contour can be dimensioned independently.

The invention claimed is:

1. A cryogenic turbopump feed line comprising:
   a main channel able to transport a cryogenic fluid,
   a plurality of secondary channels parallel to and disposed on a periphery of an external perimeter of the main channel, each secondary channel of the plurality of secondary channels being axially discontinuous, and
   a plurality of connecting radial orifices between the main channel and the secondary channels.

2. The cryogenic turbopump feed line according to claim 1, wherein the plurality of secondary channels are disposed all around the main channel.

3. The cryogenic turbopump feed line according to claim 1, wherein the plurality of secondary channels are disposed partially around the main channel.

4. The cryogenic turbopump feed line according to claim 1, wherein at least one portion of an arcuate contour passing through a center of each of the plurality of secondary channels has a ratio between a length of the at least one portion of the contour not crossing a secondary channel to a total length of the at least one portion of the contour less than 40%.

5. The cryogenic turbopump feed line according to claim 1, wherein the plurality of secondary channels is opening out onto at least one of an upstream end and a downstream end of the line.

6. The cryogenic turbopump feed line according to claim 1, wherein the main channel and the plurality of secondary channels are separated by a strip of thickness less than 3 mm.

7. The cryogenic turbopump feed line according to claim 1, wherein the secondary channels have a substantially circular cross-section.

8. The cryogenic turbopump feed line according to claim 1, wherein a cross-section of the main channel has a surface between 50 mm$^2$ and 700 mm$^2$, perpendicularly to a flow direction.

9. The cryogenic turbopump feed line according to claim 1, wherein a gap between two successive secondary channels in a vicinity of an element of a contour of the main channel with no ridges is less than 3 mm.

10. The cryogenic turbopump feed line according to claim 1, wherein the main channel has a substantially circular cross-section.

11. The cryogenic turbopump feed line according to claim 1, wherein the main channel has a cross-section in a shape of a water drop, with a base having substantially the shape of an arc of a circle with two ends from which two joining segments extend.

12. The cryogenic turbopump feed line according to claim 1, wherein an insulating material is provided in the secondary channels.

13. The cryogenic turbopump feed line according to claim 12 wherein the insulating material is a special epoxy resin for cryogenic applications.

14. A method for manufacturing the cryogenic turbopump feed line according to claim 1, having at least one manufacturing step by an additive manufacturing method.

15. The cryogenic turbopump feed line according to claim 1, further comprising an interstitial material between two successive secondary channels located on a same axis.

* * * * *